(12) United States Patent
Perera et al.

(10) Patent No.: US 8,474,399 B2
(45) Date of Patent: Jul. 2, 2013

(54) PRODUCTION OF NANOPARTICLE-COATED YARNS

(75) Inventors: Willorage Rathna Perera, Raynham, MA (US); Gerald J. Mauretti, Fall River, MA (US)

(73) Assignee: Pascale Industries, Inc., Pine Bluff, AR (US)

( * ) Notice: Subject to any disclaimer, the term of this patent is extended or adjusted under 35 U.S.C. 154(b) by 0 days.

(21) Appl. No.: 13/507,485

(22) Filed: Jul. 5, 2012

(65) Prior Publication Data

US 2012/0301719 A1 Nov. 29, 2012

Related U.S. Application Data

(62) Division of application No. 12/230,616, filed on Sep. 2, 2008, now Pat. No. 8,236,376.

(51) Int. Cl.
*B05C 19/00* (2006.01)
(52) U.S. Cl.
USPC ........... 118/308; 118/315; 118/325; 118/420; 118/66; 118/DIG. 18
(58) Field of Classification Search
USPC .................. 118/308, 310, 315, 325, 420, 66, 118/DIG. 18, DIG. 22; 65/447, 450, 529; 428/375
See application file for complete search history.

(56) References Cited

U.S. PATENT DOCUMENTS

| | | | | |
|---|---|---|---|---|
| 4,068,615 A | * | 1/1978 | LeNir | 118/665 |
| 4,822,677 A | | 4/1989 | Brotz | |
| 5,022,344 A | * | 6/1991 | Kundis | 118/56 |
| 5,562,946 A | * | 10/1996 | Fofonoff et al. | 427/2.31 |
| 5,593,736 A | * | 1/1997 | Cowen et al. | 427/492 |
| 5,725,668 A | * | 3/1998 | Foster et al. | 118/411 |
| 5,851,450 A | | 12/1998 | Rennie et al. | |
| 6,474,972 B1 | | 11/2002 | Endo et al. | |
| 2002/0033134 A1 | | 3/2002 | Fannon | |
| 2007/0169692 A1 | | 7/2007 | Barker et al. | |
| 2008/0170982 A1 | | 7/2008 | Zhang et al. | |

FOREIGN PATENT DOCUMENTS

| | | | |
|---|---|---|---|
| EP | 0521710 | * | 1/1993 |
| JP | 03019902 | | 1/1991 |

OTHER PUBLICATIONS

Koniz, Self-Detoxifying Textiles for Chemical and Biological Agent Protection, TechTextil (2006).

* cited by examiner

*Primary Examiner* — Laura Edwards
(74) *Attorney, Agent, or Firm* — Michael de Angeli

(57) ABSTRACT

A strand is coated with a powdered material by first applying a layer of hot polymer resin to the strand, and spraying the powdered material onto the resin-coated strand from at least three nozzles disposed along the processing path and spaced radially therearound. The spray apparatus is disposed within nested containers so as to limit the escape of overspray powder. The powder-coated strand may be heat-set to increase the adhesion of the powder.

18 Claims, 1 Drawing Sheet

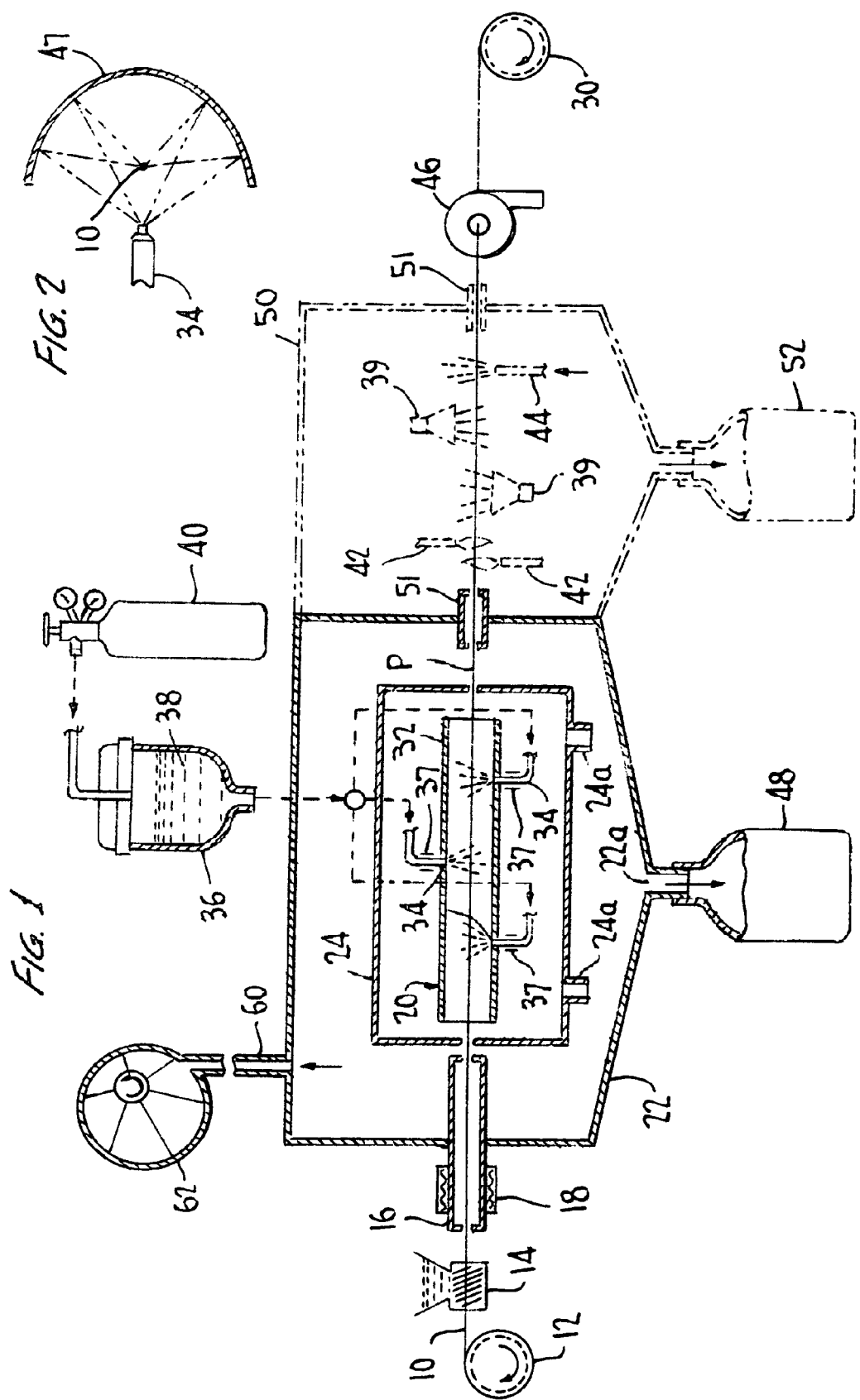

they do not in themselves form part of the present invention, insofar as the manufacture of polymer fibers by extrusion, the various processes that can be practiced on the extruded strand, and the take-up of the strand on a reel are well-known in the textile arts.

PRODUCTION OF NANOPARTICLE-COATED YARNS

This is a divisional application of application Ser. No. 12/230,616, filed Sep. 2, 2008, now U.S. Pat. No. 8,236,376.

FIELD OF THE INVENTION

This invention relates to manufacture of yarns comprising a polymer or metallic core coated with durable outer layers of particulate material retained by a polymer layer, so as to provide an outer layer exhibiting specific engineering properties. Various useful properties could thus be imparted to yarns which can be employed for many desirable purposes, for example, to make fabric having desired characteristics.

BACKGROUND OF THE INVENTION

It is desired to fabricate yarns that are coated in ceramic or other particulate materials and which are suitable for the manufacture of fabric which could be used in a variety of ways. For example, it is known that appropriately processed ceramic "nanoparticles" of titanium dioxide ($TiO_2$, or "titania") and aluminum oxide ($Al_2O_3$, or "alumina"), which have very high surface areas for their weight, are known to be absorbent of biohazardous materials. See Koniz, "Self-Detoxifying Textiles for Chemical and Biological Agent Protection", a paper presented in 2006 at a conference entitled TechTextil. Koniz also suggests that certain polyoxometalate and chloramide particles may be useful for similar purposes.

Thus, a yarn comprising a polymer core and a durable coating of these nanoparticles that is suitable for manufacture of fabric for use in garment manufacture would be highly desirable in manufacture of protective clothing, tents, buildings, and the like.

Polymer yarns might also usefully be coated with other types of particles for other purposes; for example, it might be possible to make a yarn with an electrically-conductive outer sheath made up of deposited conductive powder. Such a yarn would have a variety of uses, such as manufacture of conductive cloth for shielding electronic components worn on one's person from EMI (electromagnetic interference) and RFI (Radio Frequency interference).

In further examples of the use of the invention, yarns coated by refractory particulate materials or advanced engineering ceramics could be used to manufacture abrasion-resistant fabrics, fire retardant fabrics, sensing fabrics, electronic fabrics, piezoelectric fabric, self cleaning and/or self repairing fabric, or all sort of intelligent fabrics. Yarns coated in retroreflective glass beads could be used to make reflective fabric, for safety garments, fabric signage, and the like.

It is also desired to coat metallic wires with a layer of polymer and then a layer of particulate material. If an electrically-conductive particulate were used such that a continuous conductive coating were formed, a coaxial wire would be provided, which could be used to carry small signals, or as a capacitor. The dielectric constant of the polymer layer could be controlled by addition of, for example, mica or ceramic particles to the polymer layer. Such a composite coaxial wire would have many uses.

Consequently, it is desired to provide a method for efficiently and reliably coating yarns with very fine, "nano-sized" particles. (It will be appreciated that use of the term "nano-sized" is not intended to imply any limitation on the invention per se.) Such yarns and the coatings thereon would need to be suitably durable for their desired use, for example, so as to be processed into cloth from which garments could be made, or otherwise employed to form the final product, and to withstand ordinary wear and tear due to use and cleaning thereafter.

One attempt to make a powder-coated yarn of which the present inventors are aware involved coating a polymer precursor strand with a UV-curable resin, spraying the coated strand with the desired powders, and then exposing the sprayed strand to UV, to cure the resin coating and fix the powder particles thereon. This was unsuccessful for a variety of reasons. The powder did not coat the surface uniformly, the powder was very inefficiently applied, and the coating was insufficiently durable. Furthermore, as the excess powder was contaminated with UV-curable resin, the recovery of excess powder was very difficult.

OBJECTS AND SUMMARY OF THE INVENTION

It is therefore an object of the invention to provide an apparatus and method whereby a polymer or metallic strand can be effectively coated by nano-particles of engineering ceramics or other materials, and which will be sufficiently durable in processing and service to be satisfactory for various desired end uses, e.g., being processed into cloth and made into garments, wearable devices, and other products. The process can be repeated, for example, in order to coat a conductive wire substrate with a coating of polymer with ceramic particles followed by a secondary process to apply an outer coating of conductive particulates. This product comprises a coaxial cable which can be used as a signal-carrying wire or as a flexible or wearable capacitor.

The above object and others which will appear below are met by the present invention, wherein a hot layer of polymer is first applied to a continuous polymer or metallic strand, typically by extrusion. The strand with the hot polymer layer thereon is then introduced to a nested arrangement of three containers, through which the strand runs in a straight line, and is then wound up on a take-up reel. Powder is sprayed onto the hot polymer-coated strand within the innermost container, which is arranged to ensure efficient coating of the strand by the powder. The outermost and intermediate containers are provided principally to control powder overspray, that is, so that powder that does not adhere to the strand can be effectively collected and reused.

The innermost container is a tube having at least three spray nozzles therein. The spray nozzles are spaced along the length of the tube, so that the spray from one nozzle does not interfere with that from another, and are disposed radially around the strand so that the entire surface of the strand is effectively coated by the powder. The tube is of relatively small internal diameter, and the powder is sprayed at relatively high pressure; the inside surface of the tube opposite the nozzles serves as a reflector, so that the powder bounces back at the strand, and so that a degree of turbulence is induced in the tube, all to ensure a uniform coating. The internal surface of the tube may be polished, to achieve the highest degree of powder reflectivity, or may be roughened somewhat, to reflect the powder diffusely so that it is deposited with lesser impact. The tubular inner container can be replaced by a set of concave reflectors, arranged opposite the spray nozzles, with the strand at the foci of the reflectors.

In order that the powder is relatively efficiently retained by the hot polymer layer, it is desirable to pass the strand through a heated tube immediately before it enters the nested containers, so as to ensure that the polymer is at the desired temperature when exposed to the powder spray. The air temperature in the nested containers can be controlled for the same reason. In some circumstances it is useful to "heat-set" the particles, by exposing the coated strand to high temperature for a short time, so that the powder particles are more effectively retained by the polymer sheath on the strand. This can be accomplished by passing the coated strand through a high intensity flame.

As noted, the process can be repeated if different layers of particulate materials are to be built up on the strand.

BRIEF DESCRIPTION OF THE DRAWINGS

The invention will be better understood if reference is made to the accompanying drawings, in which:

FIG. 1 is a schematic view of apparatus for carrying out the invention; and

FIG. 2 is a schematic side view illustrating a preferred arrangement of powder spray nozzle, the strand to be coated, and a spray reflector.

DESCRIPTION OF THE PREFERRED EMBODIMENTS

FIG. 1 shows, as mentioned, a schematic diagram of equipment for carrying out the method of the invention. A continuous strand 10 of a material to be coated is pulled from a supply reel 12. A typical strand is 500 denier multifilamentary polyethylene terephthalate (PET) yarn. Alternatives that have been successfully tried include 630 denier nylon yarn and PET yarns comprising one 500 denier and one 220 denier strand. Alternatively, a metallic wire may be employed as the material of the strand. Strand 10 is first coated with a layer of hot polymer resin, typically in a conventional "cross-head" extruder 14. The resin can be polypropylene (PP), glycol-modified polyethylene terephthalate (PETG), or other suitable resins known to the art which solidify when cooled. UV-curable resin might also be used. Typically a 4 mil layer of resin is applied. For example, a 720 denier strand 10 is approximately 12 mils in diameter; in that case, the inlet die to the extruder 14 will be 12 mils in diameter and the extruder die 20 mils in diameter, so that a layer of resin approximately 4 mils thick is provided on the 12 mil strand.

It is considered important to the practice of the invention that the resin coating be quite hot when the powders are sprayed onto the resin-coated strand. It would be possible, but is often inconvenient, to supply the resin-coated strand directly to the powder-spraying apparatus 20. Where this is inconvenient, necessitating that the resin coating be maintained at a suitable temperature for powder adhesion, the resin-coated strand can be passed through a heater comprising a metal tube 16 fitted with a band heater 18. The temperature of the resin coating as it enters the powder-spraying apparatus 20 can be monitored using infrared temperature-measuring equipment and used to control the band heater.

As noted above, one problem encountered in the prior art was in controlling and collecting the overspray, that is, the sprayed powder that is not adhered to the resin coating on the strand 10. One type of desired powders are extremely fine "nano-sized" ceramic particles, sometimes of flake-like configuration. Suitable particles of both the $TiO_2$ and $Al_2O_3$ materials are available from NanoScale Materials, Inc. of Manhattan, Kans. These are typically characterized by the manufacturer as having a mean aggregate size of 5 microns, this being specified such that half of the total particles in a sample are 5 microns or smaller. Other nanoparticles of comparable sizes with which the method of the invention may be useful are silver-coated copper flakes, to form a conductive coating, or silver-coated glass beads. If not carefully collected, overspray powder of this fineness will disperse throughout the working area. Apart from the inefficiency in use of these expensive materials, this can pose a health hazard, and is a nuisance. Therefore, according to one aspect of the invention, the powder-spraying apparatus 20 is disposed in an outer container 22 and in an intermediate container 24. As described below, this has advantages in controlling and collecting the overspray.

Outer container 22 and intermediate container 24 each define inlet and exit apertures, through which the strand 12 is drawn, defining a processing path P. As illustrated, the processing path P extends along a straight line from supply reel 10 to a take-up reel 30; it would clearly be undesirable to pass a strand covered in hot, essentially liquid resin over directional sheaves or the like. The inlet and exit apertures are sized such that the strand 12 fits relatively closely therethrough without touching the edges of the apertures, so as to limit the escape of overspray particles and simplify control of temperature and pressure within the containers. A labyrinthine path is thus provided between the spray apparatus and the ambient atmosphere, limiting the escape of overspray powder. As illustrated, heated tube 16 can extend into the outer container 22, and might extend into the intermediate container 24 as well, to enable control of the temperature of the resin as it enters the powder-spraying apparatus 20. In the embodiment illustrated, the end of tube 16 thus effectively defines the inlet aperture to outer container 22.

The powder-spraying apparatus 20 comprises a relatively small-diameter tube 32, e.g., ½ to ¾ inch inside diameter by about three to six inches long. By comparison, intermediate container 24 may be a plastic tube three inches in diameter by a foot or more long, and outer container 22 a box fabricated of plastic sheet on the order of one foot deep and wide and several feet long. Intermediate and outer containers 24 and 22 may be made of transparent plastic, to allow visual monitoring of the process, while tube 32 is preferably steel, for durability.

Mounted at intervals along the length of tube 32 are at least three powder-spraying nozzles 34, connected to a reservoir 36 of the powder 38 to be applied to the strand. The preferred reservoir is the ProBlast available from the Vaniman Manufacturing Company, of Fall Brook, Calif. This product is normally offered for providing a spray of blasting media of various types for cleaning and related purposes. The Vaniman product comprises a canister having an inlet for compressed gas, coupled to a diffuser located in the lower section of the container, so as to aerate the powder. Gas flowing into the container then enters an exit tube with an open end near the top of the container, and which extends out the bottom of the container. A powder inlet hole is provided in the exit tube, just above the bottom of the container, so as to be juxtaposed to the powder in the lower portion of the container. The aerated powder is drawn into the inlet hole by a vacuum created by the gas flowing through the exit tube. Thus the diameter of the inlet hole controls the maximum size of the powder particles that are withdrawn and sprayed onto the hot resin. The results discussed herein were obtained with an inlet hole of 25 microns diameter.

Reservoir 36 is pressurized, preferably by hot, dry air, in order to avoid particle agglomeration and maintain a good flow through the nozzles 34. Dry air is used to remove the moisture so the powder stays loose, without agglomerating. "Charged air", that is, air that is partially ionized, typically by being passed over a series of metallic spikes charged to several thousand volts may also be used to reduce electrostatic-related difficulties. This is a standard method of eliminating static-related problems. It may also be desirable to use a gas other than air, e.g., dry nitrogen or argon, to avoid oxidation of the hot resin; these gases can be supplied as indicated from a tank 40. As indicated by dashed lines, reservoir 36 is connected by tubing to nozzles 34, and powder flows therethrough, as indicated by arrows. Nozzles 34 are disposed radially around the processing path P so that the entire surface of the strand 12 is effectively exposed to the powder sprayed from nozzles 34; accordingly, if three nozzles 34 are provided, they should be spaced 120° from one another around the processing path P. Furthermore, nozzles 34 are spaced along processing path P so that the spray from one nozzle does not interfere with that from another.

It is also within the scope of the invention to heat the powder just prior to its being sprayed onto the resin-coated strand, to further improve adhesion of the powder to the resin; this could be accomplished by employing metal tubing at the entry to the nozzles and disposing band heaters therearound, as indicated at 37. Alternatively, or additionally, the propelling gas could be heated to heat the powder.

The pressure of the gas propelling the powder from the nozzles 34, the size of the orifices on the nozzles, the reservoir design, and the internal diameter of the tube 32, are all important parameters as to which further optimization might be performed; these parameters might also vary somewhat with the fineness of the powder, the shape of the powder, its ability to disperse, its "air friendliness" (that is, the degree to which it tends to be entrained in a stream of compressed gas) and its composition.

It will be apparent that the size of the apertures in the nozzles, together with the air pressure and characteristics of the reservoir 36, largely controls the rate of powder flow. Good results with the alumina and titania powders discussed above have been obtained using the Vaniman reservoir with a 25 micron inlet hole, with the spray pressure at 40-45 PSI and three spray nozzles of 0.048" diameter, in a tube 32 of ½ inch ID. It appears that when operating under these circumstances, the inner wall surface of the tube 32 opposite the nozzles serves to reflect the powder overspray back toward the strand, contributing to even and thorough coverage of the resin layer by the particles. As noted, the inner surface of the tube 32 is preferably polished so that the powder will be effectively reflected. If this surface is roughened, the powder sprays tend to be diffused, reducing the impact of the powder in the hot polymer layer. The degree of pressure in the tube is preferably at least sufficient to ensure a considerable amount of turbulence in the tube, further ensuring full coverage.

It is also within the scope of the invention to replace the continuous tube 32 with a set of at least three concave parabolic reflectors 47, disposed opposite the three nozzles 34. Doing so would reduce any tendency of the powder to build up in tube 32. The location of the strand 10 and the tip of each nozzle 34 with respect to the focal point of the corresponding reflector are such that the reflector 47 effectively reflects the sprayed powder 38 on to the side of the moving strand 10 opposite the respective nozzle 34, improving the uniformity of spray coverage. See FIG. 2.

After exiting tube 32, the powder-coated strand may be heated rapidly to high temperature to heat-set the powder particles to the resin layer. Without intending to limit the invention to any particular theory of operation, it appears that exposing the coated strand to high temperature may also serve to bond the powder particles to one another, to a degree, and may also assist in bonding the particles to the polymer-coated strand. For example, if the powder particles are of an easily-soldered or tinned conductive material, rapid heating may be adequate to at least partially solder the particles to one another, providing an substantially continuous electrically conductive outer layer on a polymer core. As noted, heat-setting may be performed by exposing the strand to a high-temperature heat source for a short time; passing the strand through one or more high intensity gas burners 42, with the strand running at 150 feet/minute, was useful in laboratory testing.

It may also be desirable to pass the powder-coated strand through an air jet 44, to blow off any unadhered powder and to cool and solidify the resin, so that the strand can be wound on a take-up reel 30 without sticking. Gas flow from the high intensity gas burners also tends to remove the loose particles. If a UV-curable resin is employed, sources of UV radiation must be provided as indicated at 39. Quality control inspection can be performed optically, perhaps by a circular array of detectors arranged to scan for substantially uniform reflection of incident light beams, as indicated at 46.

As mentioned above, it is important to effectively collect the overspray, that is, the quantity of powder that does not adhere to the strand. This is accomplished according to the invention by disposing the spray apparatus 20, comprising tube 32 (or a set of reflectors 47, if employed) within which the powder is sprayed onto the strand, within intermediate and outer containers 24 and 22. As noted, the entry and exit apertures in containers 22 and 24 through which the strand passes are made as tight-fitting as feasible, providing a labyrinthine path between the spray apparatus and ambient atmosphere, to limit powder escape. The apertures can be provided as tubular members, as shown at 51, to further limit escape of the powder. Powder escaping from tube 32 will tend to collect inside the intermediate container 24, and can be removed therefrom by apertures 24*a*. Thence, the powder falls into the lower portion of outer container 22, where it falls via exit aperture 22*a* into a collecting canister 48 for reuse. Thus, powder escaping from tube 32 must pass through a number of tightly-fitting apertures in order to reach the outer atmosphere. Of course, the apertures can be sealed when the apparatus is deactivated, and compressed air applied to nozzles 34 for cleaning.

Preferably, the interior of container 22 is negatively-pressurized, that is, a moderate vacuum is applied. Ambient air is then drawn into the container 22 via the strand entry and exit apertures, tending to keep the powder confined. More specifically, one or more ports 60 in the box 22 are connected to a vacuum filtration and collection system, shown schematically at 62, to collect the excess powder. However, due to the incoming 45 psi air stream, this vacuum is not entirely effective. Canister 48 is thus provided to recover the powder that is not collected by the vacuum system 62.

If an air jet 44 is used to blow excess powder from the strand, it should be contained to limit the escape of powder, as indicated by container 50 shown in dashed lines, along with another powder-collecting canister 52; a second intermediate container comparable to container 24 might similarly be provided. Heat-setting gas jets 42 might also be so enclosed, as they would also tend to blow loose powder off the strand.

Accordingly, the method of the invention for coating a strand of a desired material, such as a polymer or an electrically-conductive metal wire, with a powdered material comprises the steps of: supplying a continuous strand from a supply reel, applying a coating of a hot polymer resin to the strand, admitting the polymer-coated strand to a multiply-enclosed spray apparatus, whereby the spray apparatus is enclosed within at least an intermediate and an outer chamber so as to limit the escape of powder overspray, spraying the powdered material onto the resin-coated strand from at least three spray nozzle assemblies disposed along the length of the spray tube assembly and disposed radially therearound, so that powder is sprayed onto the strand from at least three different directions, while maintaining the resin sufficiently hot to retain the sprayed powder, thereby forming a coating of the particulate material of the powder on the strand, allowing the resin to solidify, and collecting the sprayed strand on a reel. Optionally, the sprayed strand can be heat-set by exposing it to very high temperature for a very short time.

The invention also includes the coated strand thus made, and products made therefrom, e.g., by weaving the strand into fabric and making garments therefrom, and otherwise.

As noted above, the invention has been successfully tested. More specifically, on the order of 45 pounds of coated material were produced, using both $TiO_2$ and $Al_2O_3$ as the material of the coating. The coated strands were produced at 150 feet per minute in continuous runs lasting 12 or more hours using a 500 denier multifilamentary polyethylene terephthalate (PET) yarn as the strand, chosen for its known suitability for weaving using conventional textile machinery.

Examination of microphotographs of the powder-coated strands of the invention indicates that a coating of powder on the order of 10-50 microns ($10$-$50 \times 10^{-3}$ millimeters) thick is successfully provided by practice of the invention as described herein. At typical points on the surface of the strand, the coating comprises on the order of tens of powder particles, layered so as to build up the total thickness of the coating.

As noted above, other known polymers, e.g., nylon, might alternatively be used as the material of the strand, although it is known that the adhesion of the polypropylene resin to PET is better than its adhesion to nylon. Bonding between the substrate strand and the resin may be improved by using coupling agents known as "tie-resin" available from MSI Technology, LLC, Equistar ("Plexar 6000" series of products), and Eastman Chemicals ("Epolene"). Successful tests were carried out using both polypropylene (PP) and glycol-modified polyethylene terephthalate (PETG) as the resin applied to the strand; other suitable resins known to the art might similarly be employed.

As described above, ceramic nanoparticles of both titanium dioxide ($TiO_2$, or "titania") and aluminum oxide ($Al_2O_3$, or "alumina"), which are known to be absorbent of biohazardous materials and thus of immediate interest, were successfully applied to the resin-coated strand, although it was noted that the titanium dioxide powder was easier to work with in various respects. As noted above, a wide variety of powders might be of interest for various end uses involving powder-coated polymer substrate strands. For example, conductive powders might be applied to polymer strand to manufacture conductive yarns, or glass beads might be applied to make yarns from which retro-reflective fabrics could be woven.

Experimentation with the process parameters continues as of the filing of this application, and further optimization thereof is within the skill of the art. It has been noted that relatively small changes in the process parameters can have significant effect in implementation. For example, it is important that the resin be quite hot so that the powder is effectively adhered when sprayed onto the resin-coated strand from short range (less than 0.25 inches) at high pressure, e.g. 45 psi. Above 540° F., the melt strength of the PETG resin changes drastically, so it was initially decided to extrude the resin at 535° F. However, this led to problems with the extruder; specifically, the polymer was too fluid and the hydraulic pressure at the tip was too low to obtain a uniform, dense coating on the strand. Further, the coating exiting the die was not symmetrical, so that the substrate fiber tended to be exposed in spots by the imperfect coating. By simply reducing the extrusion temperature to 520° F., a much better coating was achieved. The coating thickness may also be increased to improve the integrity of the coating.

The temperature of the heated tube 16 was maintained at 600° F. At the processing speed of 150 fpm, heat from the tube does not further heat the resin, but simply prevents it from cooling excessively.

As of the filing date of this application, the combination of a 500 denier PET multifilamentary yarn as the strand, polypropylene resin as the polymer extruded thereon, and titanium dioxide powder as the particulate sprayed thereon appears the most promising combination for further development of fibers to be employed in manufacture of fabric for protective clothing, but the invention is not to be thus limited.

For example, preliminary tests were run successfully using conductive "Silcoflake" silver coated copper flake particles from Technic, Inc. of Cranston. The same company also offers "SilGlass" silver coated glass beads. Both products might be useful in forming electrically conductive coatings for yarns.

It is also within the scope of the invention to apply a particulate powder to substrates other than polymer strands using the method of the invention. More specifically, it appears that an electrically conductive wire serving as the substrate strand and provided with a coating of electrically-conductive particulate material would be a useful product. Presuming that the electrically-conductive particulate material could be successfully processed to form a continuously conductive coating, such a product would comprise a coaxial cable, having a central conductor shielded by the conductive coating, which would be suitable for carrying small signals. Such a product, comprising a dielectric between a central conductor and a conductive outer layer, would also be a capacitor. Both might be very useful in the manufacture of smart garments (in which the threads of the fabric of the garment serve as the conductors and/or capacitors of the wiring of a communications device or the like integrated with the garment) and other products envisioned for the future.

Manufacture of a coaxial cable as above could be accomplished simply by employing a metallic conductor as the strand 10 supplied to the apparatus of FIG. 1. A polymer coating would be applied by extruder 14, and a coating of a conductive particulate applied in spray apparatus 22; the particulates of the coating could be integrated into a substantially continuous conductor by singeing it at 50.

In some circumstances it may also be desired to spray on two or more coatings of the same or different particulates. This could be accomplished in a single operation by duplicating the key parts of the apparatus of FIG. 1, or by running the strand through the apparatus twice, first applying a first polymer layer and spraying on a first particulate, letting this solidify, and then applying a second polymer layer and a coating of a second particulate. Such a two-step process would be useful to form a coaxial capacitor, as above; a wire would form the strand, a first spraying operation could be used to spray ceramic particles onto a layer of a first polymer, to increase the dielectric constant of the layer of the first polymer, a second polymer layer would then be applied, and a second spraying operation used to apply conductive particulates, thus providing a conductive coating forming the outer electrode of the capacitor. Singeing could be performed after either or both spraying operations.

Various further alternatives also within the scope of the invention include simultaneous processing of plural substrates, and altering the properties of the resin applied in the extrusion coating step by addition of various materials. The precursor thus formed could then be powder-coated according to the method of the invention, to complete a desired product. For example, it is within the the invention to simultaneously extrusion-coat two wires with a resin that contains particles which are known to enhance the capacitance of the resin, e.g., mica powder. The capacitor thus formed can then be powder-coated to achieve a desired additional property; for example, $TiO_2$ could be sprayed onto the precursor to provide bio-hazardous protection. Such a yarn might be used simultaneously as an electrical conductor or capacitor, and as a bio-hazardous protector.

Therefore, while a preferred embodiment of the invention has been described in detail herein, those of skill in the art will recognize that various improvements and modifications can be made thereto without departure from its essential spirit and scope. Accordingly, the invention is not to be limited by the above exemplary disclosure, but only by the following claims.

What is claimed is:

1. An apparatus for coating a strand with
a powdered material in a continuous process, comprising:
a source of strand material to be coated;
a device for supplying the strand to be coated from a spool;
a device for heating a quantity of a polymer resin;
a device for applying a layer of the heated polymer resin over the strand;
a outermost spray enclosure, having an entry for the strand having had said resin layer applied and an exit for the strand, having been powder-coated within said outermost spray enclosure, defining a processing path for the strand;
an intermediate enclosure within said outermost enclosure, also having an entry for the strand having had said resin layer applied and an exit for the powder-coated strand, arranged around said processing path;
an innermost spray assembly within said intermediate enclosure, comprising at least three spray nozzles mounted at spaced locations along the processing path, having spray orifices directed toward and disposed radially around the processing path;
reflective surfaces disposed opposite said at least three nozzles, for reflecting powdered material sprayed from said nozzles onto the surface of the strand opposite the corresponding nozzle;
a pressurized spray source for providing streams of the powdered material to said spray nozzles, whereby the resin-coated strand is substantially uniformly coated by the powdered material;
a collection device for collecting excess powdered material from within the outermost enclosure, intermediate enclosure, and innermost spray assembly, and
a take-up reel device for winding up the powder-coated strand.

2. The apparatus of claim 1, further comprising a device for heat-setting the applied powdered material by exposing the powder-coated strand to high temperatures for a short time.

3. The apparatus of claim 2, wherein said device for heat-setting comprises a gas burner through which the strand is passed at high speed.

4. The apparatus of claim 1, further comprising a device for controlling the temperature of the strand having had the resin layer applied until it enters the innermost spray tube assembly.

5. The apparatus of claim 4, wherein said device for controlling the temperature of the strand having had the resin layer applied comprises a tube having a band heater attached thereto through which the strand is passed after application of the resin layer to the strand.

6. The apparatus of claim 1, wherein said resin layer is applied to said strand by extrusion of the resin over the strand.

7. The apparatus of claim 1, wherein the nozzles are mounted to a tube comprised by the innermost spray assembly, whereby the inner surface of said tube serves as the reflective surface corresponding to each of the nozzles.

8. The apparatus of claim 7, wherein the inside diameter of said tube is sized with respect to the pressure at which said powdered material is sprayed such that there is substantial turbulence within the tube, so as to increase the frequency of incidence of said powdered material on the resin-coated strand.

9. The apparatus of claim 1, wherein the reflective surfaces of the innermost spray assembly comprise discrete reflectors disposed opposite each of the nozzles.

10. The apparatus of claim 1, wherein the reflective surfaces of the innermost spray assembly are formed by the inner surface of a tube within which the strand to be coated passes and to which said at least three spray nozzles are mounted.

11. The apparatus of claim 1, wherein the reflective surfaces of the innermost spray assembly are polished.

12. The apparatus of claim 9, wherein said reflectors are substantially parabolic, with the nozzles and strand being disposed with respect to the reflecting surface such that powder sprayed from the nozzle is reflected onto the rear surface of the strand, opposite the nozzle.

13. The apparatus of claim 1, wherein the pressure of air inside the outermost chamber is controlled to aid in limiting the amount of the powdered material that reaches the atmosphere and in powder recovery.

14. The apparatus of claim 1, wherein the material of the strand is selected from the group consisting of polyethylene terephthalate and nylon.

15. The apparatus of claim 1, wherein the material of the strand is an electrically conductive metal.

16. The apparatus of claim 1, wherein the material of the resin is selected from the group consisting of glycol-modified polyethylene terephthalate and polypropylene.

17. The apparatus of claim 1, wherein the material of the powder is selected from the group consisting of titanium dioxide, aluminum oxide, electrically conductive powder, retroreflective glass beads, polyoxometalates and chloramides.

18. The apparatus of claim 1, wherein said entry and exit of said outermost chamber are defined by tubular inlet and outlet members closely fitting around said strand, whereby a labyrinthine passage is provided between the innermost spray assembly, intermediate chamber, and outermost chamber, whereby powdered material not adhering to said resin-coated strand may be effectively prevented from escaping to the ambient atmosphere.

* * * * *